United States Patent [19]
Okuie

[11] Patent Number: 5,934,593
[45] Date of Patent: Aug. 10, 1999

[54] TAPE TENSIONER FOR USE IN MAGNETIC RECORDING-PLAYBACK DEVICE

[75] Inventor: Takahiro Okuie, Nara, Japan

[73] Assignee: Sanyo Electric Co., Ltd., Osaka, Japan

[21] Appl. No.: 09/049,107

[22] Filed: Mar. 27, 1998

[30]     Foreign Application Priority Data

Mar. 28, 1997  [JP]  Japan ..................................... 9-078336

[51] Int. Cl.⁶ ............................. G11B 15/46; G11B 15/32
[52] U.S. Cl. ................... 242/353; 242/334.6; 242/335.1;
360/71; 360/85; 360/93
[58] Field of Search ................. 242/353, 334.6,
242/355.1; 360/71, 85, 93

[56]          References Cited
U.S. PATENT DOCUMENTS 5,430,585  7/1995  Takada et al. ............................. 360/85

*Primary Examiner*—John Q. Nguyen
*Attorney, Agent, or Firm*—Armstrong, Westerman, Hattori, McLeland & Naughton

[57]          ABSTRACT

A tension lever is pivoted to a chassis at one side of a reel support and has attached thereto in the vicinity of the pivoted portion opposite ends of a tension band reeved around the reel support. First and second two tension springs are provided between and fitted to a control lever and the tension lever each pivoted to the chassis and rotatable to different positions for different tape running modes. The second tension spring is fitted to the control lever with play in the direction of stretch of the spring. For reverse playback, the control lever rotates within the limits of play of the second spring to stretch the first spring only. The control lever stretches both the two springs for usual playback.

4 Claims, 6 Drawing Sheets

TAPE TENSIONER FOR USE IN MAGNETIC RECORDING-PLAYBACK DEVICE

FIELD OF THE INVENTION

The present invention relates to a mechanism for use in magnetic recording-playback devices wherein a magnetic tape is used, the mechanism being adapted to tension the magnetic tape during running.

BACKGROUND OF THE INVENTION

FIG. 7 is a fragmentary plan view of a tape tensioner the present applicant has already disclosed (see U.S. Pat. No. 5,430,585). The drawing shows the tensioner in an unloading state with a magnetic tape T accommodated in a cassette 2. A mechanism deck 100 includes a chassis 1 which has rotatably mounted thereon two reel supports 4 fitting to the respective hubs of the cassette 2. One of the reel supports 4 rotates clockwise during usual playback with small frictional resistance, permitting the tape T to be pulled out under tension. During reverse playback, the reel support 4 rotates counterclockwise to take up the tape T. The take-up torque is transmitted from a known friction mechanism 9 for producing rotational torque by receiving rotation from a drive motor (not shown) to the reel support 4 via a swing idler 90 and an intermediate gear 91.

A tension lever 5 pivoted as at 55 to the chassis 1 at the left of the reel support 4 has a free end carrying an upright tension pin 53 to be in contact with the tape T during running. A tension band 50 reeved around the reel support 4 has opposite ends attached to the tension lever 5 in the vicinity of its pivoted portion.

When the tension lever 5 is positioned in the cassette 2 as loaded in place, a leading guide block 95 for loading the tape T is in a standby position as brought close to the tension lever 5, restraining the lever 5 from rotating counterclockwise inadvertently.

Provided on the rear side of the chassis 1 is a circular-arc control slide 8 rotatable about a phantom point P on the chassis 1. A control lever 7 supported at an intermediate portion thereof by a pivot 75 on the rear side of the chassis 1 has one end engaged in a cam groove 80 formed in the control slide 8. The other end of the control lever 7 extends through the chassis 1 to project toward the same side as the tension lever 5. A tension spring 3 is provided between and engaged with the tension lever 5 and the control lever 7.

FIG. 8 is a plan view showing the tensioner as positioned for usual playback, and FIG. 9 is a plan view showing the same as positioned for reverse playback. In these two running modes, the leading guide block 95 is away from the position of the cassette loaded in place and has completely loaded the tape in position. The difference between the two running modes is that the length of the tension spring 3 stretched by the pivotal movement of the control lever 7 differs.

For usual playback, the control slide 8 rotates counterclockwise about the point P, causing the control lever 7 to stretch the tension spring 3 as shown in FIG. 8. The tension lever 5 rotates counterclockwise, pulling the tension band 50 to offer resistance to the rotation of the reel support 4. At this time, the reel support 4 is in rotation in a direction to pay off the tape T. The tape T is given a tension corresponding to the rotation resisting torque offered to the reel support 4 and divided by the diameter of winding of the tape. The tension pin 53 is in contact with the rear side of the tape T. When the tension on the tape T increases, the tension pin 53 is pushed by the tape T, slackening the tension band 50 and reducing the resistance against the reel support 4 to lessen the tension on the tape. Conversely, if the tension on the tape T diminishes, the tension band 50 is pulled by the tension spring 3, offering greater resistance to the rotation of the reel support 4 and giving an increased tension to the tape.

For reverse playback, the control slide 8 further rotates counterclockwise as shown in FIG. 9. Since the tape T is wound up by the rotation of the reel support 4 during reverse playback, the resistance to the rotation needs to be less than is the case with usual playback. Accordingly, the control lever 7 rotates in such a direction as to reduce the stretch of the tension spring 3, decreasing the tension on the tension band 50. The resistance to the rotation of the reel support 4 becomes smaller than in the usual playback operation.

Thus in the conventional device, the single tension spring 3 gives resistance to the rotation of the reel support 4 during usual playback and reverse playback.

However, the completely rotated positions of the tension lever 5 and the control lever 7 involve variations, which produce variations in the stretched length of the tension spring 3. Accordingly, if the single tension spring is used in the different running modes for giving resistance to the rotation of the reel support 4, the resistance to be offered to the reel support 4 can not be set at accurate values for the respective tape running modes for usual playback and reverse playback, with the result that the force of the tension pin 53 pushing the tape T becomes indefinite, failing to tension the tape with good stability.

If the resistance to rotation increases, the tape take-up torque for reverse playback decreases to result in the likelihood that the tape T will not be wound up. To obviate this drawback, the friction mechanism 9 for giving the take-up torque to the reel support 4 may be altered to a known mechanism to afford higher rotational torque for reverse playback than for usual playback, whereas the friction mechanism 9 then becomes complex in construction.

SUMMARY OF THE INVENTION

The main object of the present invention is to set the resistance to be offered to the rotation of the reel support 4 at accurate values for the respective tape running modes so as to tension the tape with good stability.

According to the present invention, two tension springs 3 and 6 are provided between and fitted to a tension lever 5 and a control lever 7, and one of the springs, i.e., the second spring 6, has one end fitted to the control lever 7 with play when free of tension.

For reverse playback, the control lever 7 is free to rotate within the limits of play of the end of the second tension spring 6, and the first tension spring 3 is stretched by the control lever 7. Thus, the first tension spring 3 only offers resistance to the rotation of a reel support 4.

For usual playback, the control lever 7 stretches the two tension springs 3 and 6, causing the two tension springs 3, 6 to offer resistance to the rotation of the reel support 4.

The first tension spring 3 needs only to give accurate resistance to rotation for reverse playback, and the rotation resistance to be given for usual playback can be supplemented by the second tension spring 6. Accordingly, the value of resistance to be given for usual playback need not be considered in designing the first tension spring 3. It is therefore possible to set the resistance to the rotation of the reel support 4 at accurate values respectively for reverse playback and usual playback and to consequently tension the tape with good stability.

DETAILED DESCRIPTION OF THE PREFERRED EMBODIMENT

Figure 1:
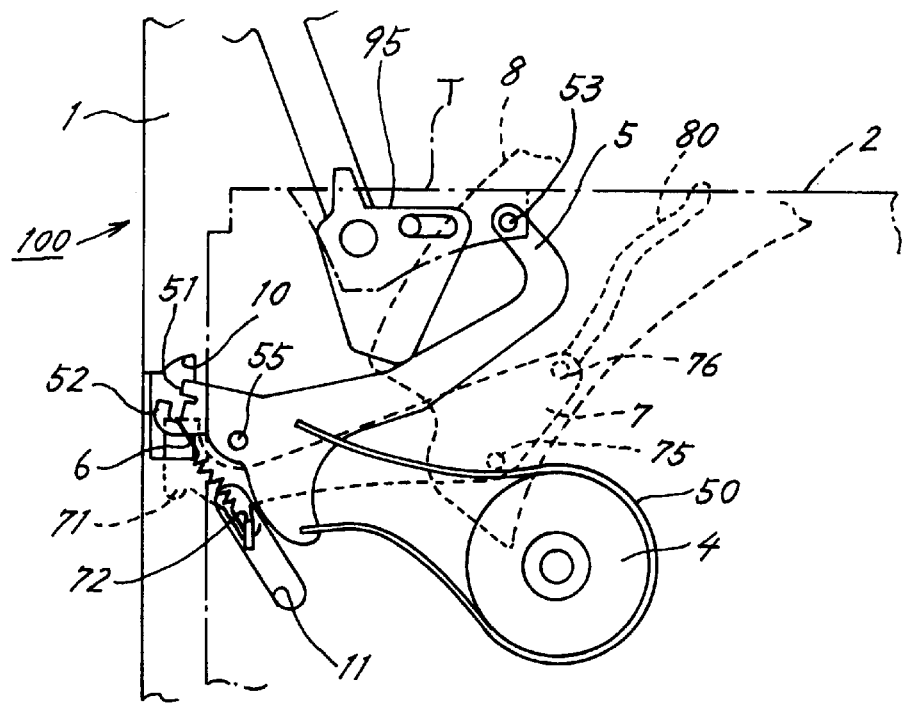
FIG. 1 is a plan view of a tape tensioner of the invention in an unloading position.
Figure 2:
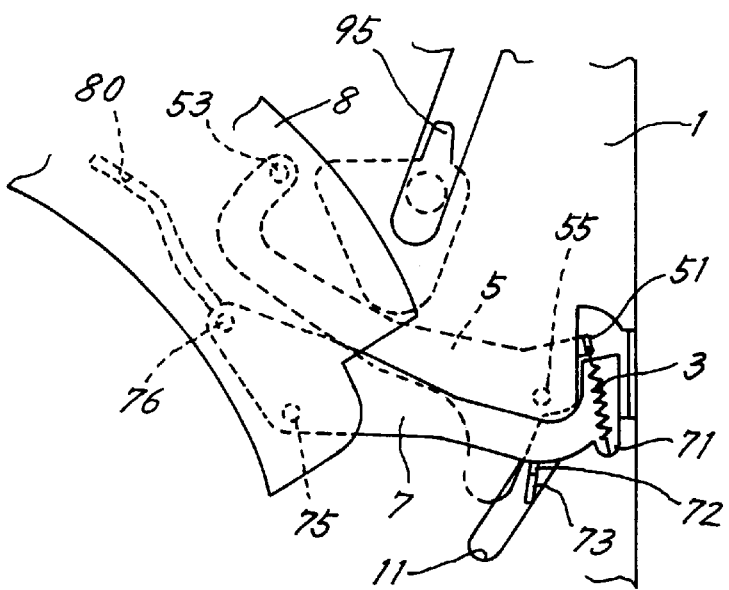
FIG. 2 is a rear view of the same.

FIG. 1 is a plan view of a magnetic recording-playback device embodying the invention, and FIG. 2 is a rear view of the same. As in the prior art, a tension lever 5 is pivoted as at 55 to a chassis 1 at one side of a reel support 4 for winding up a tape T during reverse playback. A tension band 50 reeved around the reel support 4 has opposite ends attached to the tension lever 5 in the vicinity of its pivoted portion 55. A circular-arc control slide 8 is provided on the rear side of the chassis 1 so as to be rotatable in a horizontal plane. Pivoted as at 75 to the chassis 1 is a control lever 7 positioned between the rear side of the chassis 1 and the control side 8. The control lever 7 has an end portion 76 fitting in a cam groove 80 formed in the control slide 8 and a free end portion provided with first and second two spring engaging lugs 71, 72. The first spring engaging lug 71 is positioned under the chassis 1, while the second spring engaging lug 72 extends through a circular-arc slot 11 formed in the chassis 1 to project upward beyond the chassis 1.

Figure 3:
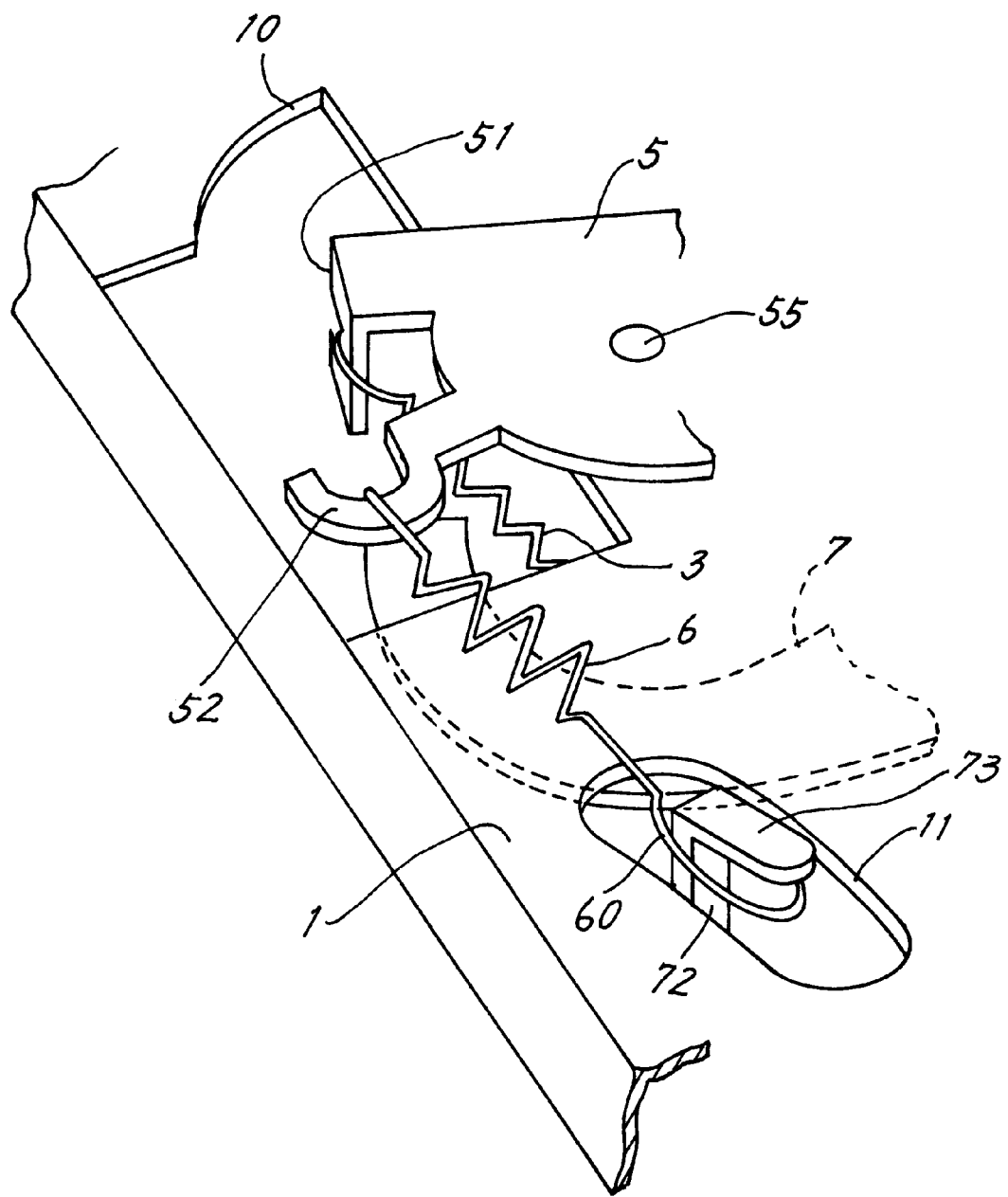
FIG. 3 is a fragmentary perspective view of the tape tensioner.

The tension lever 5 has first and second two claws 51, 52 projecting therefrom in the vicinity of its pivoted portion 55. The first claw 51 is bent downward and extends through an opening 10 formed in the chassis 1 to the rear side of the chassis 1. The second claw 52 is positioned at the front side of the chassis 1 and is in the form of a hook (see FIG. 3). FIG. 3 is a fragmentary perspective view of the tension lever 5 and the control lever 7 shown in FIG. 1. A first tension spring 3 is provided between and fitted to the first claw 51 of the tension lever 5 and the first spring engaging lug 71 of the control lever 7. A second tension spring 6 is provided between and fitted to the second claw 52 and the second spring engaging lug 72.

In an unloading state, the first tension spring 3 is slightly stretched from its free length, giving a tension to the tension lever 5 and the control lever 7 at all times. The second tension spring 6 has an elongated end portion 60 fitting to the second spring engaging lug 72 with play. The second lug 72 has a flange 73 projecting horizontally from its upper end for preventing the spring 6 from disengaging from the lug 72 inadvertently. The second spring 6 remains free of tension in the unloading state, giving no tension to the tension lever 5 or the control lever 7.

The device has a fast forward/rewind (FF/REW) tape running mode in addition to the usual playback mode and reverse playback mode. As the control slide 8 shown in FIG. 1 rotates counterclockwise in a horizontal plane, the device in the unloading state is brought into the reverse playback mode, then into the usual playback mode and thereafter into the FF/REW mode.

Figure 4:
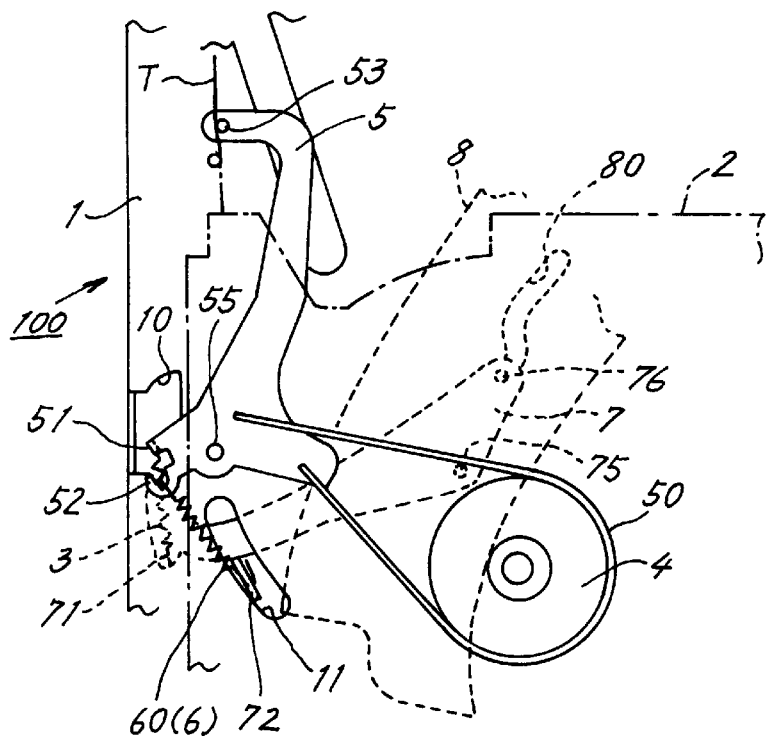
FIG. 4 is a plan view of the tape tensioner as positioned for reverse playback.

FIG. 4 is a plan view of the tension lever 5 as positioned for reverse playback. The control lever 7 having the end portion 76 fitted in the control slide 8 rotates counterclockwise about the pivot 75 from the unloading state, stretching the first tension spring 3. However, the second spring engaging lug 72 of the control lever 7 merely moves within the limits of play of the end portion 60 of the second tension spring 6, permitting the spring 6 to remain unstretched. In the reverse playback mode, therefore, the first tension spring 3 only exerts a tensile force on the tension lever 5, and the resistance offered to the rotation of the reel support 4 is smaller than in the usual playback mode as will be described below.

Figure 5:
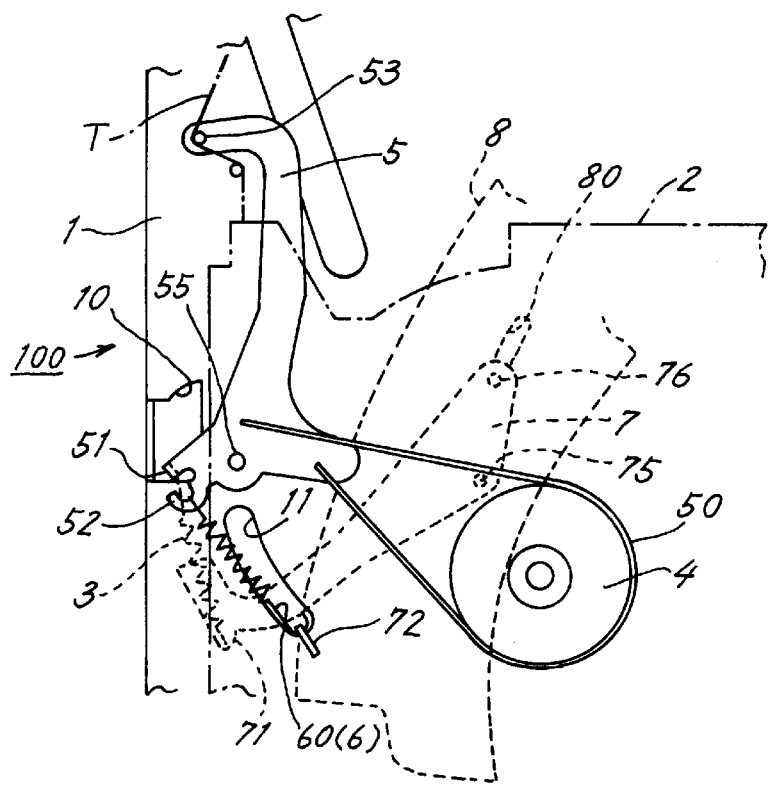
FIG. 5 is a plan view of the tape tensioner as positioned for usual playback.

FIG. 5 is a plan view of the tension lever 5 in the usual playback mode. The control slide 8 rotates further counterclockwise from its position in the reverse playback mode, rotating the control lever 7 further counterclockwise. The first tension spring 3 is further stretched to bias the tension lever 5 counterclockwise. During the change of mode from reverse playback to usual playback, the second spring engaging lug 72 of the control lever 7 starts to pull the end portion 60 of the second tension spring 6, causing the second spring 6 to bias the tension lever 5 counterclockwise during usual playback. Thus, the tensile forces of both the first and second tension springs 3, 6 act on the tension lever 5 in the usual playback mode.

Figure 6:
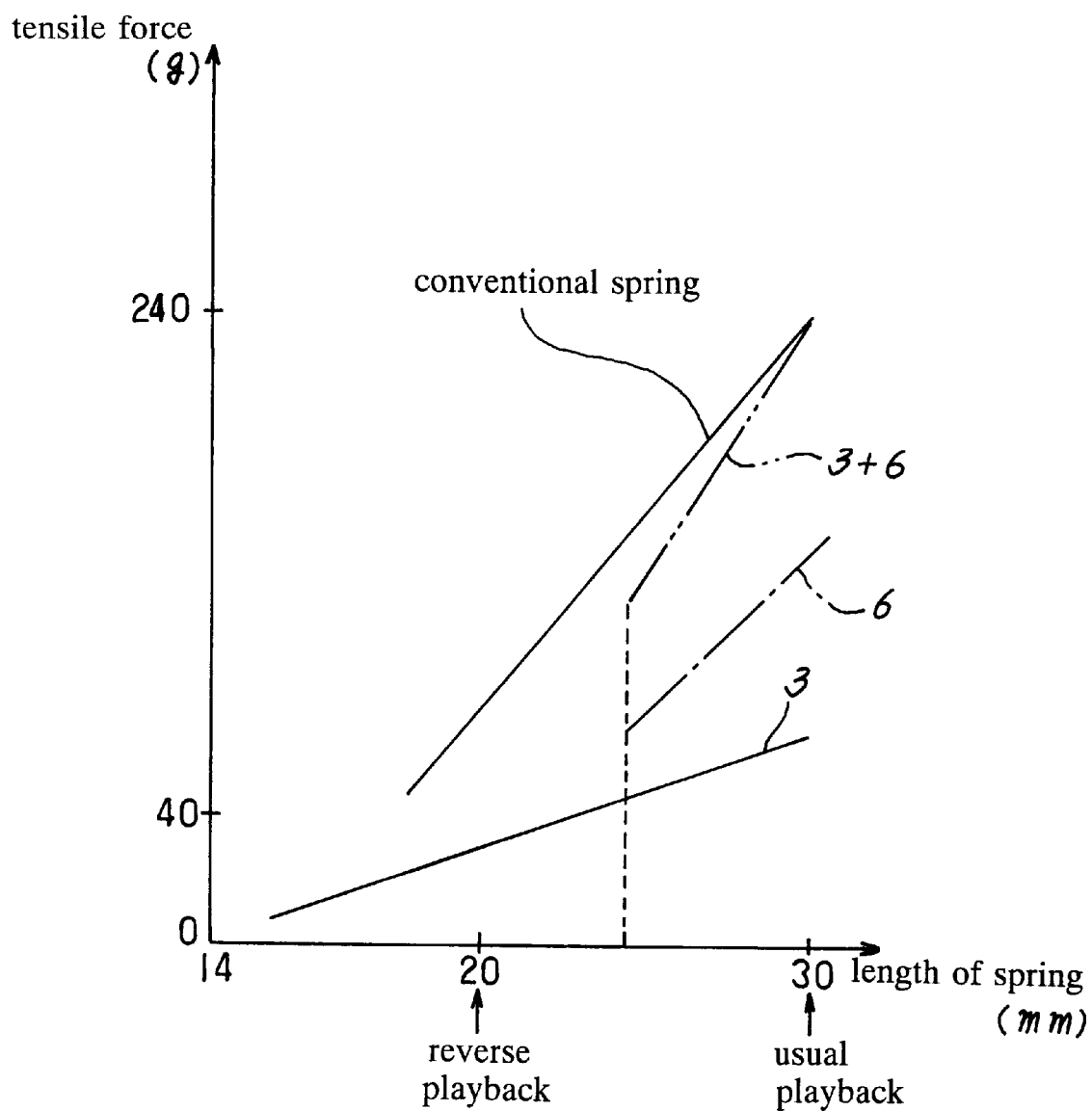
FIG. 6 is a graph showing the relationship between the load of the two tension springs and the lengths of the springs.
Figure 7:
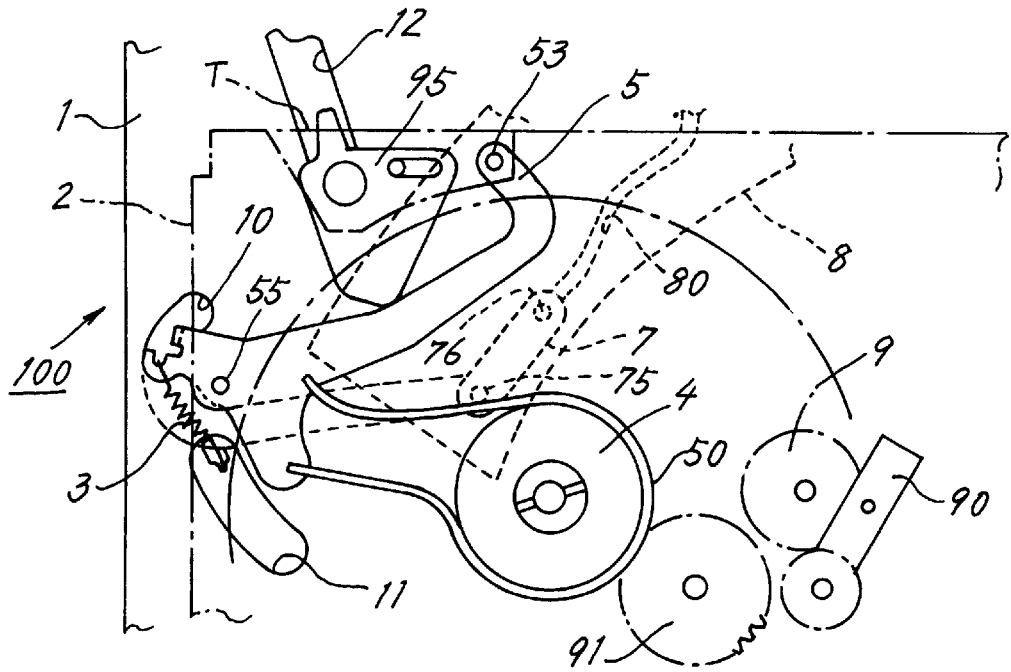
FIG. 7 is a plan view of a conventional tape tensioner in an unloading position.
Figure 8:
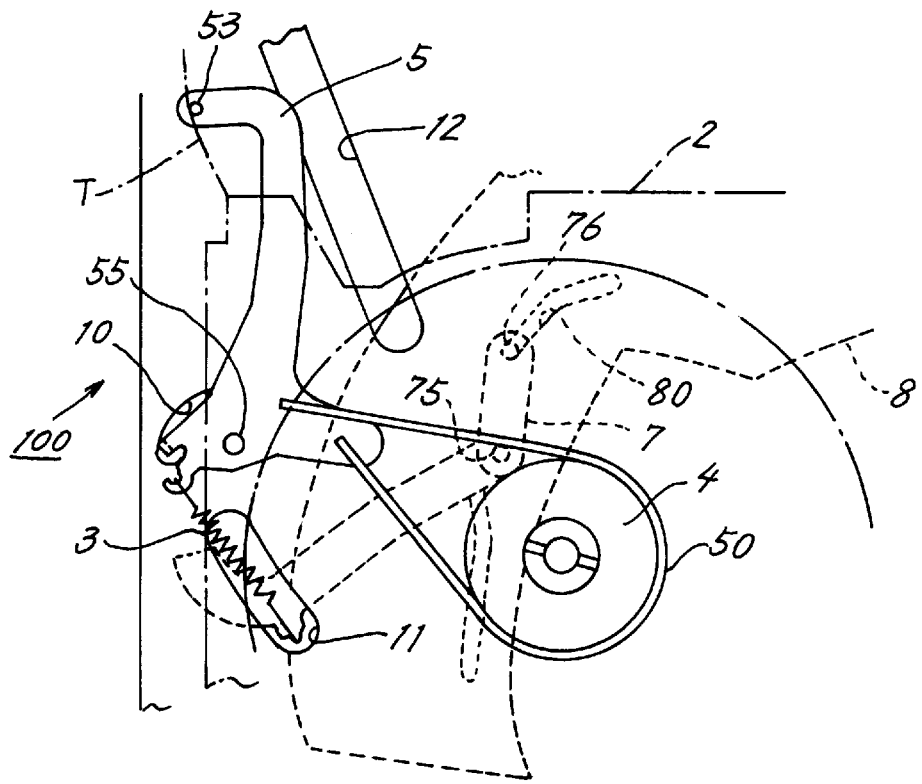
FIG. 8 is a plan view of the same as positioned for usual playback.
Figure 9:
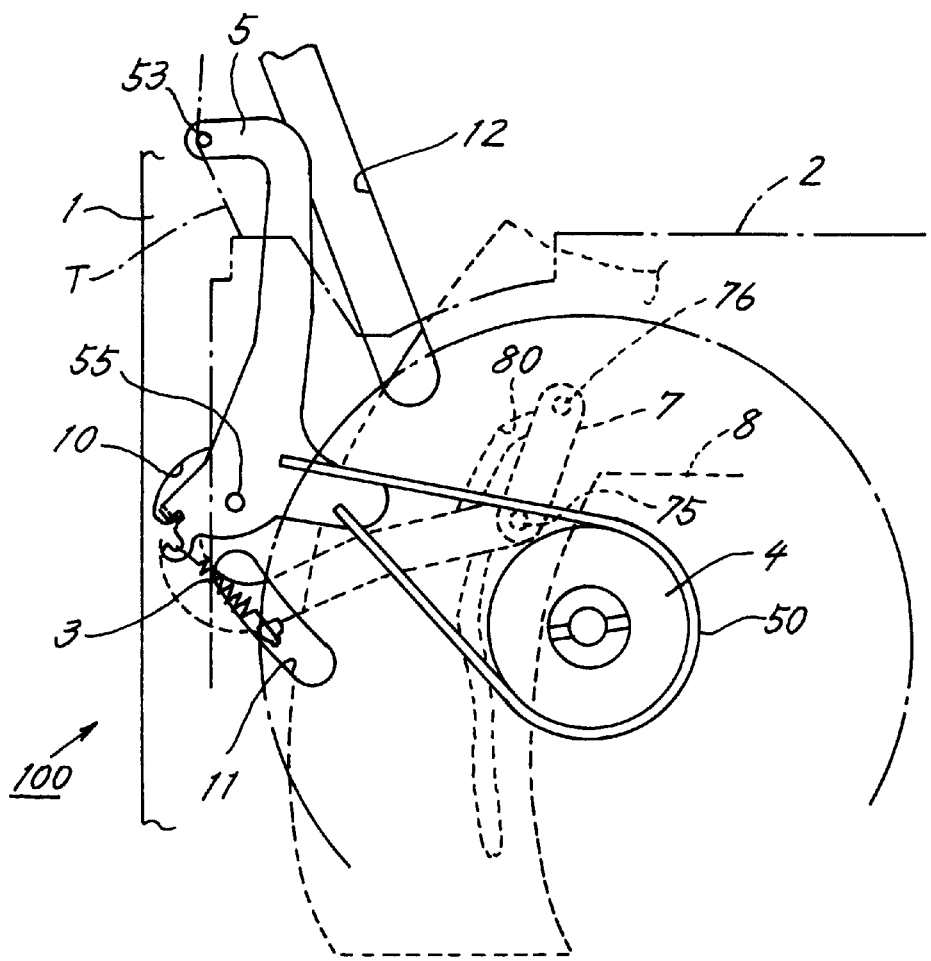
FIG. 9 is a plan view of the same as positioned or reverse playback.

FIG. 6 is a graph showing the relationship between the tensile forces of the two tension springs 3, 6 and the entire lengths of the springs. The length of the first spring 3 is indicated in a solid line, and the length of the second spring 6 in a chain line.

The entire length of the first tension spring 3 is 20 mm for reverse playback and 30 mm usual playback. It is assumed that the tension lever 5 is subjected to a tensile force of 240 g by the two tension springs 3, 6 in the usual playback mode. Since the second spring 6 is stretched during the change from reverse playback to usual playback, the tensile force exerted on the tension lever 5 until the springs are stretched to the respective lengths for usual playback after the start of stretch of the second spring 6 is represented by a two-dot chain line.

Because the first tension spring 3 only is stretched for reverse playback, the first spring 3 is designed in consideration of the value of force to be given in the reverse playback mode. Further because the two tension springs 3, 6 are stretched for usual playback, the second spring 6 needs only to supplement the deficiency of force the first spring 3 alone fails to provide. Consequently, the resistance to be offered to the rotation of the reel support 4 in the two modes of usual playback and reverse playback can be set at respective accurate values so as to tension the tape accurately.

The first tension spring 3 can be designed with consideration given only to the force to be given for reverse playback unlike the single spring conventionally used for offering rotation resistance in the two running modes, so that the spring can be designed with greater freedom. In other words, the spring can be smaller than the conventional spring in spring constant. This serves to diminish variations in the value of resistance to be offered to the rotation of the reel support 4 in other running mode. Incidentally in the FF/REW mode, resistance to the rotation of the reel support 4 is given to accurately wind up the tape T into the cassette 2 and also enable the tape to run with good stability.

A change-over between the other running mode and the reverse playback mode is likely to cause a variation in the tension on the tape for one cause or another. However, when the tension lever 5 and the control lever 7 are connected together by the first tension spring 3 which is low in spring constant, the tension lever 5 is then readily rotatable against the tensile force of the first spring 3 to lessen the variation of the tape tension.

The second tension spring 6 is fitted to the control lever 7 with play according to the present embodiment, whereas the spring 6 may be so fitted to the tension lever 5.

What is claimed is:

1. A tape tensioner for use in a magnetic recording-playback device including a reel support mounted on a chassis for winding up or paying off a tape T and having at least two tape running modes of usual playback and reverse playback, the tape tensioner comprising a tension lever pivoted to the chassis and provided at a free end thereof with a tension pin movable into contact with the tape T for sensing the tape tension, and brake means responsive to the position of the tension lever for offering resistance to the rotation of the reel support when the tape T is paid off therefrom for usual playback, the tension lever being biased into rotation toward the tape being paid off from the reel support, the tape tensioner being characterized in that:

first and second biasing means are mounted on the chassis and coupled to the tension lever for giving a tape biasing force to the tension pin, the tension pin being biased by both the first and second biasing means during usual playback, the tension pin being biased only by the first biasing means when the reel support winds up the tape T during reverse playback.

2. A tape tensioner according to claim 1 wherein the first and second biasing means are first and second tension springs, respectively, provided between and fitted to a control lever and the tension lever each rotatable to different positions on the chassis for the different tape running modes, the second tension spring having an end portion fitted to the control lever or the tension lever with play in the direction of stretch of the spring when free of tension, the control lever being rotatable for reverse playback within the limits of play of the fitted end portion of the second tension spring to stretch the first tension spring, the control lever being further movable for usual playback to stretch both the tension springs and bias the tension lever in the tape paying-off direction.

3. A tape tensioner according to claim 2 wherein the first tension spring is smaller than the second tension spring in spring constant.

4. A tape tensioner according to claim 2 wherein the spring given the play has at least one end engaged with the tension lever or the control lever with a backlash corresponding to the amount of play.

* * * * *